Oct. 6, 1970   P. J. HOGAN ET AL   3,532,009
INDEXING PAWL
Filed Oct. 29, 1968   2 Sheets-Sheet 2
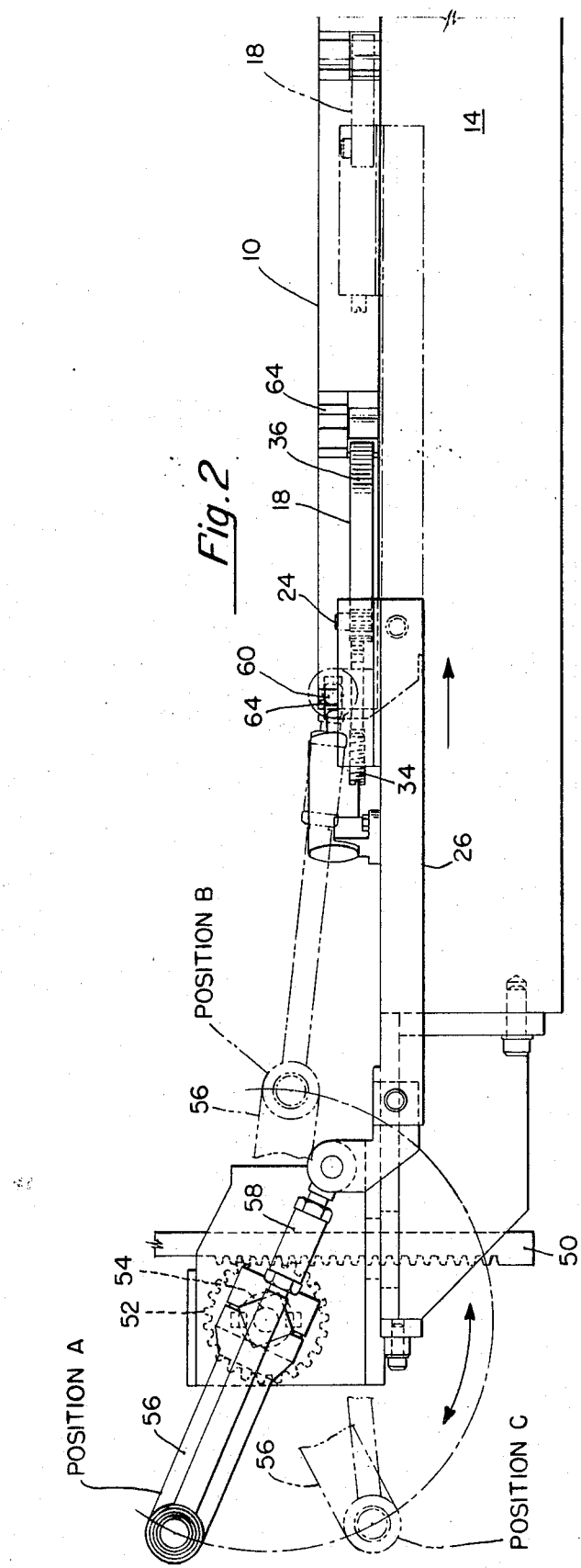
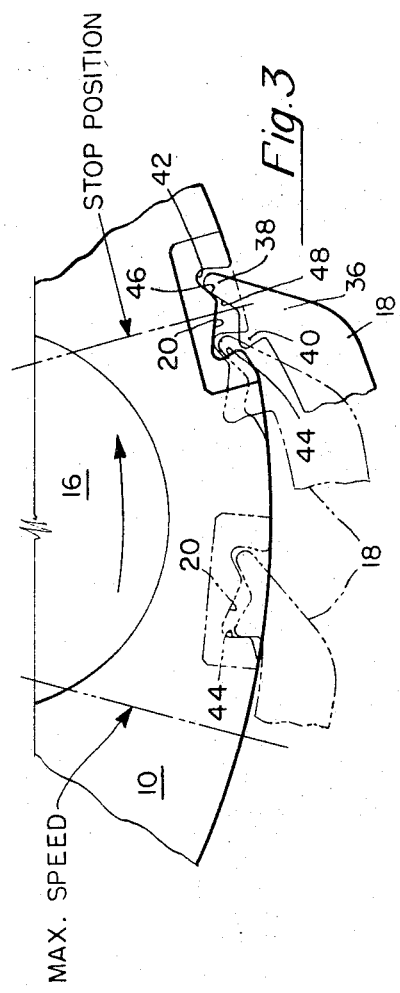
INVENTORS
PATRICK J. HOGAN
BY THOMAS R. STRANG, JR
ATTORNEY

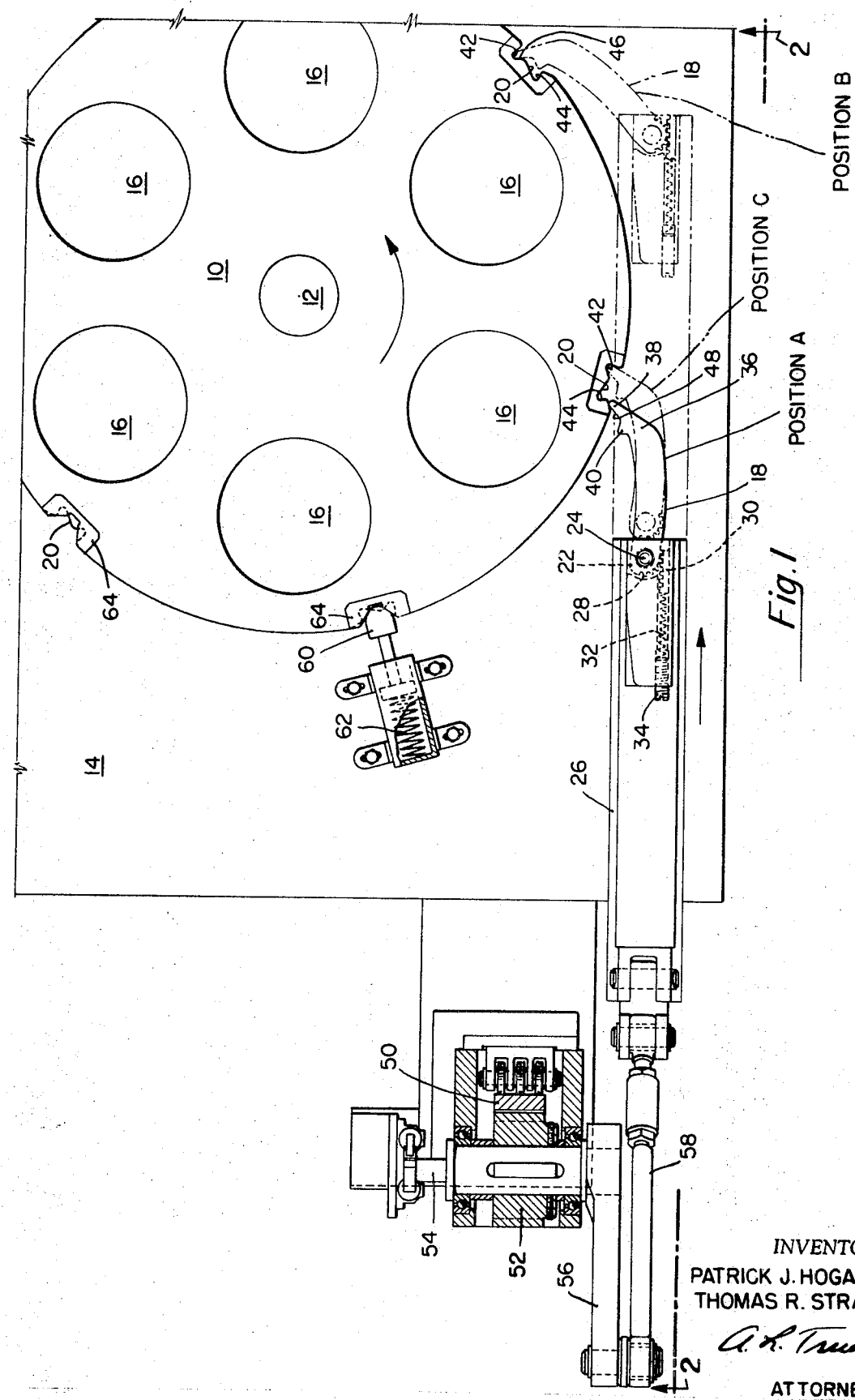

United States Patent Office 3,532,009
Patented Oct. 6, 1970

3,532,009
INDEXING PAWL
Patrick J. Hogan, Mount Clemens, and Thomas R. Strang, Jr., Detroit, Mich., assignors to The Budd Company, Philadelphia, Pa., a corporation of Pennsylvania
Filed Oct. 29, 1968, Ser. No. 771,581
Int. Cl. B23b 29/24
U.S. Cl. 74—817          5 Claims

ABSTRACT OF THE DISCLOSURE

An apparatus for indexing a work table having stations thereon so that the stations are moved one at a time into a work position for work to be performed on the workpiece positioned at the station. The indexing means having a pawl for pushing and retarding the table as required in the movement of the table between the work positions.

---

This invention relates to an indexing device and more particularly to an indexing pawl and associated contact notches.

The common practice for controlling rotational movement of a work table includes a brake which provides a continuous drag upon the rotation of the table. In this type control, the indexing power means must overcome the drag of the brake and the inertia of the table during each movement.

An object of this invention is to eliminate the required brake by providing a pusher pawl designed to retard the indexed table as the table approaches the desired position.

Another object of this invention is to provide a cooperating notch with a camming surface therein for the pusher pawl for camming the pawl from the notch as the desired position is reached.

These and other objects of this invention will become more apparent as reference is made to the specification and accompanying drawings wherein:

FIG. 1 is a plan view, with sections broken away, of the novel indexing means showing the pawl (in solid lines) at the beginning of a power stroke and in phantom lines as it engages the cooperating notch and also at the end of the power stroke.

FIG. 2 is a view substantially in the direction of the arrow 2—2 of FIG. 1 illustrating the positions of the pawl driving means during the power stroke.

FIG. 3 is an enlarged plan view of a portion of the indexing table showing the relative position of the pawl and cooperating notch approaching and reaching the stop position.

This invention is directed to an indexing pawl and cooperating notches in a rotatable multi-station work table. The indexing pawl cooperates with the notches to translate rectilinear motion of the pawl into rotative movement of the table for moving the stations of the work table into and from a work position.

Referring now to the drawings, as best seen in FIG. 1, a work table 10 is rotatably mounted on a shaft 12 supported on the machine base 14. A plurality of stations 16 are spaced about the work tables 10 for receiving workpieces (not shown) and moving the workpieces into a working position or work station by rotation of the table for performance of an operation on the workpiece such as a stamping or drilling operation by a machine tool (not shown). After the workpiece has been machined, it is rotated from the work station as the next workpiece is moved into the working position at the work station.

To provide motive power and index the stations 16 of the work table 10 into the working position, a novel indexing pawl 18 is provided. A plurality of cooperating notches 20 are spaced about the outer periphery of the work table 10 for cooperating with the indexing pawl 18 to rotate the table.

The indexing pawl 18 has one end 22 pivotally mounted on a pin 24 secured to a slide member 26. A plurality of teeth 28 are formed on the outer periphery of end 22 and engage a ratchet member 30 slidably mounted in the slide member 26 and biased into engagement with the pawl teeth 28 by a spring 32. An adjustment screw 34 supports one end of the spring 32 and may be used to vary the spring pressure on the ratchet member 30 as needed. As can best be seen in FIG. 1, the biasing action of spring 32 urges the other end 36 of pawl 18 against the work table 10 at all times.

The other end or pusher end 36 of pawl 18 has a pusher point 38 and a hook point 40 for rotatively pushing the work table 10 and for retarding the rotation of the work table, respectively.

The cooperating notches 20 of the work table 10 has a configuration to accommodate the pusher end 36 of pawl 18. A point receiving recess 42 on one side of the notch 20 receives the pusher end 36 and a hooking surface 44 on the other side of the notch 20 cooperates with the hook point 40. A cam surface 46 extends toward the center of notch 20 from the point receiving recess 42 for cooperating with a mating cam surface 48 extending from pusher point 38 of pawl 18 for caming the pawl 18 from the notch as will be explained later in the specification.

The power source for this indexing device reciprocally drives a rack 50 having the teeth thereon engaged with the teeth of gear 52 which is secured to the drive shaft 54 for movement therewith. A drive arm 56 has one end secured to the drive shaft 54 for movement therewith and the other end is pivotally connected to one end of the ram 58. The other end of the ram 58 is pivotally connected to the slide member 26 for moving the slide member back and forth as the rack 50 is reciprocated.

At best seen in FIG. 1, a positioning plunger 60 is adjustably mounted on the machine base 14 and biased into contact with the edge of the work table 10 by a spring 62. A plurality of positioning inserts 64 are secured along the periphery of the work table 10 by welding or other suitable means for cooperating with the positioning plunger 60 to properly locate the work table 10 after each indexed movement. The positioning inserts 64 could also be machined from the edge of the work table if desired. The positioning plunger 62 and positioning insert 64 assure proper alignment of the work stations 16 with the machine tools.

Thus in operation, as rack 50 is driven upwardly, as seen in FIG. 2, the drive arm 56 pivots counter clockwise from Position A, in solid lines to Position B in phantom lines. In position A, as shown in solid lines in FIG. 1, the pawl 18 is positioned adjacent a notch 20 and biased against the work table 10 by spring 32. The initial movement of the drive arm 56 and ram 58 to Position C, shown in phantom lines in FIG. 2, moves the slide 26 to the right and causes the pawl 18 to engage its pusher point 38 in the receiving recess 42 of the adjacent notch 20, as seen by the phantom line Position C of FIG. 1. Continued movement of the drive arm 56 and ram 58 to Position B moves the slides 26 to the right and causes the work table 10 to rotate counter clockwise about shaft 12 moving the next work station 16 into the alignment with the machine tool.

Referring now to FIG. 3, as the work table 10 is rotated by the pawl 18, the circular path of drive arm 56, being translated into linear motion by the slide member 26 and then rotative motion by the work table 10, provides increasing acceleration until the drive arm is normal to the plane of slide member 26 and at a maximum speed, and the deceleration to Position B or the stop position. The inertia imparted to the work table 10 by the initial movement carries the table faster than the decelerating pawl 18 and causes the hook point 40 to contact hooking surface 44 to retard the rotative movement of the work table 10. As the work table 10 approaches the next work station position, the notch cam surface 46 coacts with the pawl cam surface 48 to move the hook point 40 of the pawl 18 from engagement with the hooking surface 44 and permits the retraction of the pawl 18 to Position A as the slide member 26 is returned to Position A by the power source. As the work table 10 comes to a stop the positioning plunger 60 engages the positioning insert 64 and positively locates the work station 16.

While but one embodiment of this invention has been shown and explained, it is our intention to be limited only by the scope of the following claims.

We claim:

1. A work table rotatably supported on a machine base and having a plurality of stations circumferentially spaced thereon and an indexing means for rotating said work table for sequentially positioning said stations in a working position, said indexing means including an indexing pawl having a pusher point and a hook point, a plurality of cooperating notches on said work table for receiving said pawl, each of said notches having a recess for receiving said pusher point and a hooking surface for cooperating with said hook point, biasing means for biasing said indexing pawl against said work table and into engagement with said cooperating notches, and power means operably connected to said pawl for linearly moving said pawl upon command whereby the pusher point of the pawl engages a recess of a cooperating notch on the work table and indexes the stations of the work table into and from the working position.

2. The work table and indexing means as claimed in claim 1 including a positioning means having a plurality of positioning inserts spaced about the outer periphery of the work table and a positioning plunger secured on the machine base for reciprocating movement into and from engagement with said positioning inserts whereby the plunger positively positions the stations of the work table in the working position when the indexing means has rotated the work table.

3. The work table and indexing means as claimed in claim 2 wherein said plunger means includes a plunger reciprocally mounted on the machine base and a spring biasing said plunger against said table and into engagement with one of said positioning inserts when the work table stops rotating from an indexing move.

4. The work table and indexing means as claimed in claim 1 wherein said indexing pawl includes a cam surface extending from said pusher point toward said hook point, and each of said cooperating notches includes a mating cam surface extending from said recess for coacting with said cam surface of said pawl for camming the hook point of said pawl from engagement with said hooking surface at the end of an indexing movement.

5. The work table and indexing means as claimed in claim including a pivotal connection between the pawl and said power means, a plurality of teeth on said pawl circumferentially spaced about said pivotal connection, a ratchet member engaging said teeth, a spring biasing said ratchet member tangentially to said teeth for rotatively biasing said pawl about said pivotal connection and against said work table.

References Cited

UNITED STATES PATENTS

| | | |
|---|---|---|
| 2,947,187 | 8/1960 | Graff et al. |
| 3,186,246 | 6/1965 | Slinker _____ 74—128 |

FRED C. MATTERN, JR., Primary Examiner

F. D. SHOEMAKER, Assistant Examiner

U.S. Cl. X.R.

74—821